United States Patent
Prasad et al.

(10) Patent No.: US 10,296,875 B1
(45) Date of Patent: May 21, 2019

(54) INTERACTIVE KIOSK FOR BRANCHLESS BANKING

(75) Inventors: Bharat Prasad, San Antonio, TX (US); Gunjan Vijayvergia, San Antonio, TX (US); Charles Lee Oakes, III, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1275 days.

(21) Appl. No.: 13/540,325

(22) Filed: Jul. 2, 2012

Related U.S. Application Data

(60) Provisional application No. 61/503,524, filed on Jun. 30, 2011.

(51) Int. Cl.
*G06Q 40/00* (2012.01)
*G06Q 20/10* (2012.01)

(52) U.S. Cl.
CPC .................... *G06Q 20/10* (2013.01)

(58) Field of Classification Search
CPC ...... G06Q 40/00; G06Q 20/10; G06Q 20/102; G06Q 20/40; G06Q 30/04; G06K 7/10415; Y10S 902/08
USPC ..................... 705/35, 36 R, 38, 43
See application file for complete search history.

(56) References Cited

U.S. PATENT DOCUMENTS

| | | | |
|---|---|---|---|
| 6,021,397 A * | 2/2000 | Jones et al. | 705/36 R |
| 7,076,458 B2 | 7/2006 | Lawlor et al. | |
| 7,090,122 B1 | 8/2006 | Warren et al. | |
| 7,191,935 B1 | 3/2007 | Brausch et al. | |
| 7,555,461 B1 | 6/2009 | Drummond et al. | |
| 7,613,643 B1 | 11/2009 | Putman | |
| 7,693,790 B2 | 4/2010 | Lawlor et al. | |
| 7,891,550 B1 | 2/2011 | Smith et al. | |
| 7,983,401 B1 | 7/2011 | Krinsky | |
| 8,225,991 B2 * | 7/2012 | Smith et al. | 235/379 |
| 2001/0042785 A1 * | 11/2001 | Walker et al. | 235/379 |
| 2003/0061113 A1 * | 3/2003 | Petrovich et al. | 705/26 |
| 2004/0117302 A1 * | 6/2004 | Weichert et al. | 705/40 |
| 2005/0121513 A1 | 6/2005 | Drummond et al. | |

(Continued)

OTHER PUBLICATIONS

Bruce, Laura. Super ATMs and Kiosks. CNNMoney.com. Apr. 4, 2001. http://cnnmoney.printthis.clickability.com/pt/cpt?action=cpt &title=Super+ATMs+and+kiosks+Apr.+4.*

(Continued)

*Primary Examiner* — Hani M Kazimi
(74) *Attorney, Agent, or Firm* — Perkins Coie LLP

(57) ABSTRACT

An automated banking terminal for facilitating a financial transaction is provided. The automated banking terminal includes a processor, a display for presenting a set of customer menu options, and a communication interface. The automated banking terminal also includes expansion slots which have a mechanical interface and an electrical interface. Expansion modules may be connected to the processor through the expansion slots. An expansion module may be a cash dispensing module, a cash receiving and counting module, a check receiving module, a printer, a scanner, a biometric interface, a signature pad, an account card reader, or an account card programmer. The processor of the automated banking terminal is configured to detect the expansion module and determine additional menu options to supplement the customer menu options based on detecting the expansion module.

19 Claims, 7 Drawing Sheets

(56) References Cited

U.S. PATENT DOCUMENTS

2007/0168283 A1* 7/2007 Alvarez et al. ............... 705/43
2009/0212105 A1* 8/2009 Couper et al. ............... 235/379
2010/0187299 A1    7/2010 Block et al.

OTHER PUBLICATIONS

Blackie Kellie. ATMs: More than Meets the Eye. Dec. 1998. NPN, National Petroleum News. ABI/INFORM Global. 90, 13. pp. 26-32.*
Paul Demery (Aug. 1997). How CSS is Changing the ATM Business. Credit Card Management, 10(5), 58. Retrieved Sep. 10, 2007, from ABI/INFORM Global Database. (Document ID: 13598194).*

* cited by examiner

INTERACTIVE KIOSK FOR BRANCHLESS BANKING

CROSS REFERENCE TO RELATED APPLICATIONS

This application claims priority to U.S. Provisional Patent Application No. 61/503,524, entitled "INTERACTIVE KIOSK FOR BRANCHLESS BANKING", which was filed on Jun. 30, 2011, the contents of which are incorporated by reference in its entirety herein.

TECHNICAL FIELD

Various embodiments of the present invention relate generally to multi-function kiosks and networked systems in which such kiosks are deployed. More specifically, various embodiments of the present application relate to an automated banking terminal kiosk with expansion slots and expansion modules and automated menu option configuration.

BACKGROUND

While online banking has increased in popularity, many banking transactions still cannot be completed exclusively through exchange of data over a network because these transactions involve exchange of tangible items. These transactions may involve cash deposits, cash withdrawals, check deposits, account cards, printed documents, documents requiring physical signatures, or other tangible items. In these cases, a customer must complete the transaction at a location which facilitates the exchange of these tangible objects. In addition, other transactions may require the use of biometric data and, therefore, also cannot be completed over the Internet or through some type of voice or data exchange.

It is costly for banks to establish staffed bank branches at locations which are convenient for all of their customers. Technology has enabled automatic teller machines (ATMs) to perform some banking functions in a wider variety of locations which are more convenient for customers. ATMs are typically designed to perform a small number of specific types of banking transactions in a fully automated manner. Adapting an ATM to perform a new type or set of transactions typically requires reconfiguring or retrofitting of the hardware, reloading of software, and/or replacement of the ATM.

ATMs are typically located in public or semi-public locations. Some customers have security and personal safety concerns with respect to performing banking transactions in these locations because the transactions often involve confidential or risky activities such as handling of cash, use of account cards, entry of personal identification numbers (PINs), entry of other transaction data, and/or opening of wallets and purses. As ATMs become more sophisticated, the transactions performed at them will also become more complex in many cases. These more complex transactions may require customers to perform more of these confidential or risky activities in public or semi-public locations. In addition, more complex transactions may increase the time it takes each customer to complete their transaction thereby increasing wait times at ATMs and/or increasing the number of ATMs which must be installed to meet the demand.

SUMMARY

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

In some embodiments, an automated banking terminal for facilitating a financial transaction is provided. The automated banking terminal includes a processor, a display for presenting a set of customer menu options, and a communication interface. The automated banking terminal also includes expansion slots which have a mechanical interface and an electrical interface. Expansion modules may be connected to the processor through the expansion slots. An expansion module may be a cash dispensing module, a cash receiving and counting module, a check receiving module, a printer, a scanner, a biometric interface, a signature pad, an account card reader, or an account card programmer. The processor of the automated banking terminal is configured to detect the expansion module and determine additional menu options to supplement the customer menu options. The additional menu items may be based on detecting the expansion module.

In some embodiments, the automated banking terminal is also configured to detect discontinued operation of the expansion module and remove the additional menu options from the customer menu options.

In some embodiments, the automated banking terminal includes a camera for monitoring a customer and performs analysis on an image from the camera to determine an identity or mood of the customer. The analysis may be performed by a processor of the automated banking terminal or by another device in another location.

In some embodiments, the automated banking terminal is configured to initiate a live interactive help session with a remote customer service agent based on the identity or the mood of the customer.

In other embodiments, the camera of the automated banking terminal is configured to monitor an area around the automated banking terminal. The processor is configured to perform analysis on an image received from the camera to determine the size of the line of customers waiting to use the automated banking terminal, estimate a wait time based on the size of the line, and transmit the estimated wait time over the communication interface.

In some embodiments, the processor in the automated banking terminal is configured to establish a wireless communication session with a customer's mobile computing device and receive instructions for the financial transaction. The instructions are input by the customer into a user interface of the mobile computing device. The instructions may be communicated from the mobile communication device to the automated banking terminal either directly or indirectly.

In some embodiments, the expansion module in the automated banking terminal is a printer and the processor of the automated banking terminal is configured to print a document associated with a customer account when the customer accesses the account.

In some embodiments, the automated banking terminal is configured to establish a communication session through the communication interface with a second automated banking terminal located within a designated distance of the automated banking terminal. The automated banking terminal then receives feature information describing one or more expansion modules of the second automated banking terminal and determines ancillary menu options to supplement the set of customer menu options based on the received feature information for the expansion module of the second automated banking terminal.

In some embodiments, the expansion module is configured to receive a cash deposit and the processor is configured to determine a deposit amount of the cash deposit. The processor then provides an access code which enables withdrawal of cash in an amount less than or equal to the deposit amount at a second automated banking terminal.

In other embodiments, the expansion module is configured to receive a cash deposit from a customer and the processor is further configured to determine a deposit amount of the cash deposit. The processor then credits a gift card account in an amount less than or equal to the deposit amount.

In some embodiments, the automated banking terminal provides a gift card associated with a gift card account to the customer.

In some embodiments, a method of facilitating a financial transaction at an automated banking terminal is provided. The method includes the steps of launching a transaction staging application on a computing device and entering transaction data associated with the financial transaction into the transaction staging application in a user interface of the computing device. The method also includes the steps of retrieving the transaction data at the automated banking terminal in response to initiation of the financial transaction at the automated banking terminal and completing the financial transaction at the automated banking terminal using the retrieved transaction data.

BRIEF DESCRIPTION OF THE DRAWINGS

Embodiments of the present invention will be described and explained through the use of the accompanying drawings.

Figure 1:
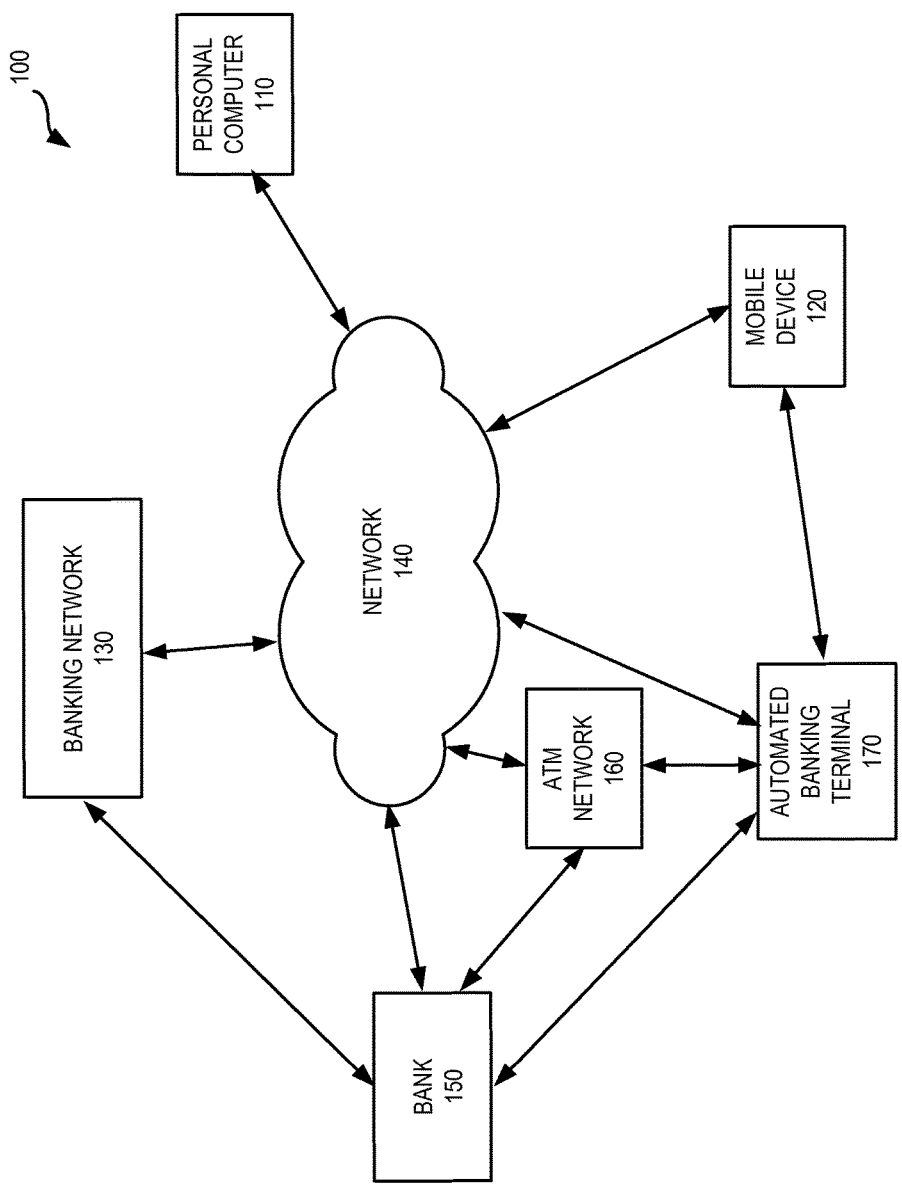
FIG. 1 illustrates an exemplary operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments or implementations described. On the contrary, the invention is intended to cover all modifications, equivalents, and alternatives falling within the scope of the invention as defined by the appended claims.

DETAILED DESCRIPTION

Various embodiments of the present invention relate generally to automated banking transactions. More specifically, various embodiments of the present invention relate to an automated banking terminal with expansion slots, expansion modules, and automated menu configuration. Some embodiments also relate to methods of facilitating a financial transaction at the automated banking terminal.

As financial institutions strive to provide more convenient banking options for their customers, the use of automated banking terminals will increase. The number and variety of transactions performed at these terminals will also increase. The changing nature of these transactions and the desire by financial institutions to continue adding new features for existing services will increase the need to make configuration of automated banking terminals more flexible. This flexibility will be necessary in order to avoid replacing or retrofitting the terminals each time a function or feature is added. While some feature additions may be accomplished with software upgrades which do not require hardware changes, many feature additions will require hardware changes as they involve operations such as handling of cash, handling of account cards, printing or scanning or documents, biometric interfaces, or other features related to tangible items.

To minimize costs as well as minimize a disruption to customer familiarity with the banking terminals, it is desirable to implement modular banking terminals in which features and functional modules may be added without replacing the terminal altogether or even without performing a significant reconfiguration of the terminal. This approach allows the financial institution to keep a standardized platform of banking terminals and implement features at various locations on as-needed or as-desired basis, by adding or replacing expansion modules, rather than the all-or-nothing approach associated with replacing entire terminals with new models.

An automated banking terminal which automatically reconfigures its user interface and menu structures provides further flexibility in several respects. First, the upgrade process is efficient. A technician need only physically install the module and allow the banking terminal to automatically reconfigure itself rather than spending the time to perform a manual reconfiguration process. A manual reconfiguration process increases cost, causes downtime, and is subject to human error. Second, modules may be easily removed from the banking terminal for repair or upgrade without a significant impact to the operation of the banking terminal. Finally, the banking terminal can detect and accommodate a failed or removed module by automatically reconfiguring menu options. This allows the banking terminal to continue operation without displaying to customers invalid menu options associated with the module which has failed or has been removed. The self-detection feature of the banking terminal may provide such status to a central host, thus allowing for an up-to-date index of the functionality available at each banking terminal. Customers may receive information regarding the specific functionality available at each banking terminal from a database or from the banking terminal itself.

The automated banking terminal also has other intelligent features which makes it more customer-friendly and able to meet more of the customer banking transaction needs which may have been traditionally performed at a staffed bank branch. These intelligent features may include processing cash deposits, generating gift or cash cards, making cash available at other terminals to other parties, printing documents, scanning documents, as well as other features. These intelligent features may also include use of a camera to monitor the customer's experience during the transaction, provide live customer support from a remote location, or determine the number of people waiting to use the terminal.

As features like those described above, as well as others, are added to banking terminals, many of the transactions performed at these banking terminals will become more complex. As the transactions become more complex, there is an increased likelihood of transactions involving confidential and/or personally risky activities being performed at the banking terminals. Customers may be concerned about the amount of information which may be in view of others as they perform these transactions in public or semi-public locations. When these transactions involve the handling of cash, checks, credit cards, financial papers, or other sensitive items, the risks, or perceived risks, may increase further.

Therefore, in some cases it will be beneficial to have the ability to stage transactions at a location other than the banking terminal by entering as much of the transaction information as possible before approaching the banking terminal. This may be accomplished on a mobile device while near the location of the banking terminal or on a computer at an entirely different location. These steps could potentially be performed anywhere including in the customer's locked car just steps away from the banking terminal. When ready, the staged information is electronically transferred to, or retrieved by, the banking terminal and the customer completes the transaction by performing the remaining steps at the banking terminal. The remaining steps are those which require some type of physical interaction with the banking terminal or transfer of tangible objects to/from the banking terminal.

Minimizing the amount of interaction required at the banking terminal minimizes the use of personal or confidential information in the public setting and minimizes the time spent handling sensitive items while standing at the banking terminal in a potentially vulnerable setting. Minimizing the amount of interaction required at the banking terminal may also reduce the wait time by reducing the amount of time each customer spends at the banking terminal. In some cases, customers may simply stage their transactions on their mobile device while standing in line waiting to use the banking terminal.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. Although many of the embodiments are described with reference to making cash deposits and performing other transactions at an automated banking terminal, the illustrated applications of the embodiments of the present invention are not meant to be limiting, but instead exemplary. The invention may apply to many other types of financial transactions performed in a variety of ways and is intended to cover all modifications, equivalents, and alternatives falling within the scope of the invention as defined by the appended claims.

Having described embodiments of the invention generally, attention is now directed to FIG. 1 which illustrates an example of an operating environment 100 in which some embodiments of the present invention may be utilized. The embodiments of the present invention illustrated in FIG. 1 allow financial transactions to be performed in a number of different ways. Operating environment 100 comprises personal computer 110, mobile device 120, banking network 130, network 140, bank 150, ATM network 160, and automated banking terminal 170.

Personal computer 110 may be any type of computing device which a customer uses to access or exchange information with a network or with another computing device. Personal computer 110 may be a computer, server, gaming console, set top box, Internet kiosk, network access terminal, or network access device of another type. Mobile device 120 may be any type of transportable computing device which a customer can use to access or exchange information with a network or with another computing device. Mobile device 120 may be a phone, smartphone, personal digital assistant (PDA), tablet computer, netbook, or transportable computer. Computer 110 and mobile device 120 may connect to network 140 directly or through other devices or connections including routers, hubs, Wi-Fi connections, modems, or other devices.

Banking network 130 may include any number of membership organizations, banks, credit unions, or financial institutions. In accordance with embodiments of the present invention, banking network 130 can use a variety of interaction methods, protocols, and systems. For example, banking network 130 may use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used.

Bank 150 may be a bank or other type of financial services institution including an insurance company, a credit union, a brokerage company, a mortgage company, or an investment services company. ATM network 160 may be any set of ATMs in an interbank ATM network and/or intrabank ATM network.

Automated banking terminal 170 may be any type of interface which customers use to perform automated banking transactions with bank 150. Automated banking terminal may be a standalone ATM or may be a set of automated banking functionality embedded in another computing device or system. In some cases, automated banking terminal 170 may comprise software which includes computer readable instructions which, when executed by a processor, direct the processor to perform the functions of an automated banking terminal. In some cases, this software may be installed and operate on personal computer 110, mobile device 120, or another computing device. Automated banking terminal 170 may interface with ATM network 160, bank 150, network 140, or any combination thereof.

As illustrated in FIG. 1, mobile device 120, automated baking terminal 170, ATM network 160, bank 150, and banking network 130 may interact with each other in a variety of ways including directly or through network 160. Using these elements, financial transactions may be performed in a number of ways or at a number of different locations. The transactions may involve other banks accessible through banking network 130, other ATMs accessible through ATM network 160, or other devices or entities accessible through network 140. The financial transactions described herein may be performed using these elements in a number of different manners or configurations.

Figure 2:
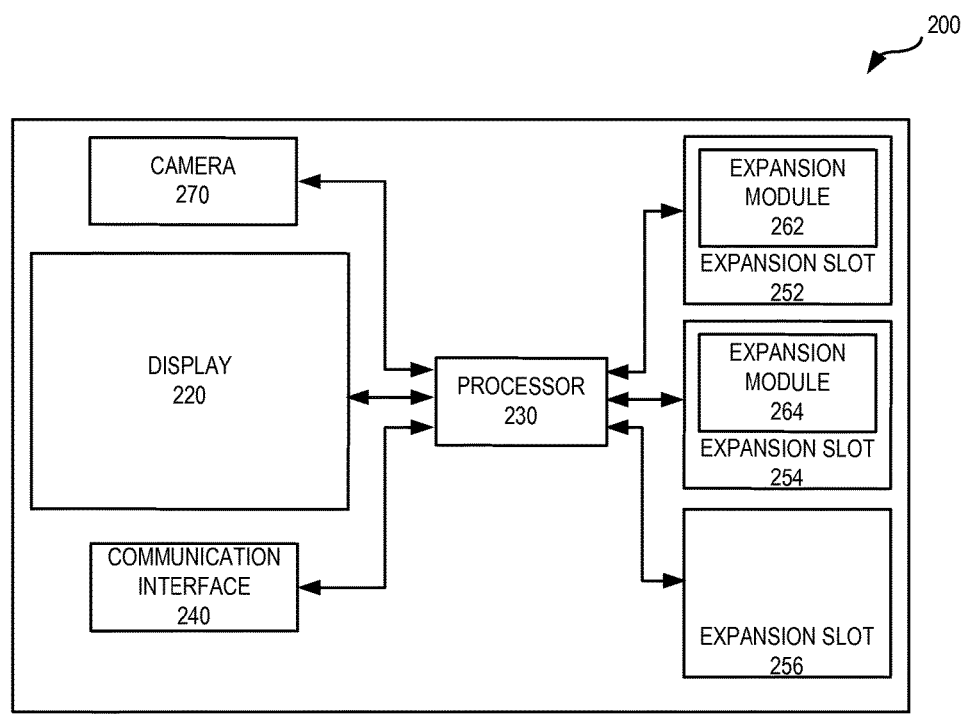
FIG. 2 is a functional block diagram of an automated banking terminal in an exemplary embodiment of the present invention.

FIG. 2 is a functional block diagram of automated banking terminal 200 in an exemplary embodiment of the present invention. Automated banking terminal 200 comprises processor 230, communication interface 240, display 220, camera 270, and expansion slots 252-256 in which expansion modules may be inserted. Automated banking terminal 200 is configured for performing automated financial transactions.

Processor 230 may be any type of microprocessor, computer, microcontroller, programmable logic, or computing device capable of executing computer readable instructions. Processor 230 is configured to direct the other elements of automated banking terminal 200 to perform the functions outlined in the claims.

Display 220 may be any type of device for visually displaying information to a customer. Display 220 may be a liquid crystal display (LCD), cathode ray tube (CRT), light emitting diode (LED) display, touchscreen, electronic paper (e-paper) display, or a display on a separate computing device. Camera 270 is any device for capturing images or video and transmitting the images or video to processor 230. Camera 270 may be a still camera, digital camera, charge coupled device (CCD), video camera, or image capture device of another type.

Communication interface 240 provides an electronic communication interface to other devices. Communication interface 240 may be a wired or wireless connection. Communication interface 240 may be a bus, a Wi-Fi connection, a cellular phone interface, a network port, a Bluetooth connection, an Ethernet port, a dedicated connection, a multiplexed port, or communication interface of another type and may use metal, air, plastic, glass, or space as the medium of communication.

Expansion slots 252-256 each provide an electrical and mechanical interface to processor 230 and automated banking terminal 200. Expansion slots 252-256 allow expansion modules of various types to be inserted into or interfaced with automated banking terminal 200. Expansion modules 262-264 are examples of expansion modules which can be interfaced to automated banking terminal 200 using the expansion slots. Expansion slots 252-256 provide standard interfaces such that different combinations of expansion modules can be interfaced to and used with automated banking terminal 200. The interfaces may be standardized to a specific model of automated banking terminal, to an entire family of automated banking terminals, or may be an industry standard used by many manufacturers. The standardized interface allows automated banking terminals to be designed relatively independently of the expansion modules and allows expansion modules to be easily designed and built to work with a variety of automated banking terminals. The standardized interface also allows the automated banking terminals to be configured in a variety of different ways.

Expansion modules 262 and 264 may be designed to perform a variety of different functions related to performing financial transactions. For example, each of expansion module 262 and 264 may be a cash dispensing module; a cash receiving and counting module; a check receiving module; a printer; a scanner; a biometric interface; a signature pad; an account card reader; an account card programmer; a card dispensing module such as for dispensing prepaid or gift cards; a check printing module which may include an ability to print traveler's checks; location aware applications and tracking services module such as GPS, gyroscope, and GIS devices; video conferencing module; augmented reality friendly devices or another type of module which adds additional functionality to automated banking terminal 200. Expansion modules may be inserted, removed, or modified to change the variety of services offered by automated banking terminal 200.

Open menu options and enable applications may be activated based on the available modules. For example, automated banking terminal 200 may not have the capability of receiving and counting cash deposits when it is initially installed. However, a cash receiving and counting expansion module could be inserted into expansion slot 256 giving it this functionality. In some embodiments, processor 230 is configured to detect the addition of the new cash receiving expansion module and determine additional menu options to be displayed on display 220 associated with the module. For example, the menus may have not previously included an option for cash deposits because automated banking terminal 200 did not have the capability of receiving cash. However, once the new cash receiving module is inserted into expansion slot 256, a cash deposit menu option may be added to the list of available menu options.

In another variation of the example above, automated banking terminal 200 may be configured to determine a deposit amount of the cash deposit and provide an access code which enables cash to be withdrawn at another automated banking terminal. Automated banking terminal 200 communicates the information to make this withdrawal possible through bank 150, ATM network 160, or network 140. The access code may be provided to the customer making the deposit or may automatically be communicated to the intended recipient of the cash through network 140.

Rather than through use of an access code, these types of transactions may also be accomplished by transferring a token to the intended recipient, transferring a token to a computing device of the intended recipient, or by crediting a mobile wallet of the intended recipient.

In another variation, a cash, gift card, or debit account may be generated based on the cash deposit. A cash, gift, prepaid or debit card may be associated with the account and may be generated and programmed by automated banking terminal 200 or by another banking terminal in ATM network 160. In some embodiments the automated banking terminal may load the cash, gift, prepaid or debit with funds.

In another variation, deposited cash may be used to pay bills using a bill pay function implemented in automated banking terminal 200 or by interfacing to an external bill pay engine through automated banking terminal 200. These payments may include person-to-person payments, person-to-business payments or bill-pay payments.

In some embodiments, the scanner module may receive documents from a customer, useful for several applications such as remote notary services and mortgage closing documents.

In some embodiments, automated banking terminal 200 is also configured to detect discontinued operation of an expansion module and remove the associated menu options. This may occur if the module is removed, fails, runs out of necessary supplies, or needs to be emptied or serviced before it can continue operation.

In some embodiments, camera 270 may be used for obtaining images of the customer. Images of the customer may be used to identify a customer for security purposes. However, images from camera 270 may also be used for other purposes including to determine the customer's mood. If, for example, automated banking terminal 200 determines that a customer is frustrated, angry, or otherwise having difficulty completing their transaction, it may automatically initiate a live interactive help session with a remote customer service agent to help resolve the issue. In another example, a customer having a particularly positive experience may be solicited for customer or marketing feedback.

Special services may also be offered to a customer based on the identity of the customer. For example, menus may be configured based on the customer identify. Menus may be selected based on the menus which are applicable to that customer's accounts or may be arranged in an order of priority based on the functions most frequently used by that customer. Many other examples are possible.

In some embodiments, camera 270, or another camera, may be used to monitor an area around automated banking terminal 200. Processor 230 is configured to perform analysis on an image received from camera 270 to determine the size of the line of customers waiting to use automated banking terminal 200. Based on this analysis, an estimated wait time is determined. The estimated wait time may displayed near the terminal, made available on the Internet, transmitted to mobile devices of customers who are waiting to use automated banking terminal 200, transmitted the operator of automated banking terminal 200, or used in other ways. In addition to the wait time, automated banking terminal 200 may also transmit information about what banking features are currently available and functioning.

In some cases, when a long line is detected, automated banking terminal 200 may disable the features which typically take up the most time in order to reduce wait times for customers in line. In order to minimize customer dissatisfaction, these disabled features may still be enabled for specific customers who have a record of having previously used these features at this terminal. This may avoid a situation in which a customer is frustrated because a feature he or she previously used at the banking terminal is not available. Making the feature unavailable to all of the other customers may be a reasonable tradeoff for reducing the wait time.

In another example, customers may be able to use a mobile device to reserve a spot in line for automated banking terminal 200 before arriving or before leaving their car. This function would effectively provide an electronic means of implementing the "now serving customer number XX" commonly implemented with paper tickets.

In addition to traditional ATM functions, expansion modules 262 and 264 may be configured to perform other types of functions. For example, expansion module 264 may include a printer and processor 230 may be configured to print a document associated with a customer account when the customer accesses the account. The document could be a banking document, a loan application, a statement, an insurance policy, a proof of insurance card, a beneficiary form, a claim form, or other document. Expansion module 264 could also be a scanner or a signature pad. These features could be used in conjunction with the cameras, live help, and other previously described features to provide, for example, remote notary services at automated banking terminal 200. The printer may be used in any enterprise application such as mortgage fulfillment where a user is required to print, sign and scan a document back to the company, a signature card printing for an account opening, printing of automobile insurance (or other insurance) proof documents, for example.

In addition, automated banking terminal 200 may be configured to provide focused marketing advertisements or materials to customers based on the types of documents they print or scan or the types of transactions they perform at the banking terminal. These marketing messages may be displayed on display 220, printed on a printer, or included with other receipts or documents provided to the customer.

In some embodiments, automated banking terminal 200 may be configured to establish a communication session with a second automated banking terminal located within a designated distance of automated banking terminal 200. This may be useful because the second automated banking terminal may have an expansion module which performs a specific function needed by a customer which is not currently available in automated banking terminal 200. Automated banking terminal 200 requests and/or receives feature information from the second automated banking terminal about the expansion modules available in the second automated banking terminal. Automated banking terminal 200 then adds menu items associated with these other expansion modules to the list of menu items available to the customer.

In some embodiments, a card receiving module may be inserted into one of the expansion slots. The card receiving module may be capable of receiving gift cards, cash cards, or other types of prepaid account cards. Upon receipt, automated banking terminal 200 may deposit the balance of these cards into the customer's account, consolidate them into a single card/account, or direct the funds associated with the card in another manner.

Figure 3:
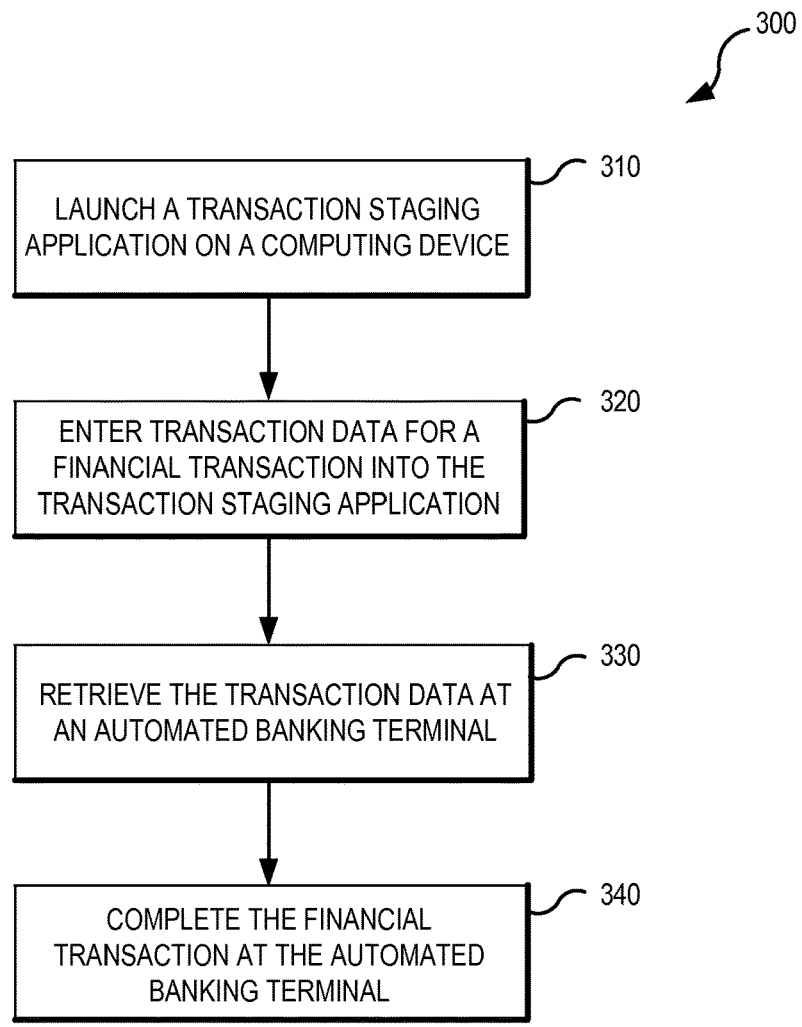
FIG. 3 illustrates an exemplary method of facilitating a financial transaction at an automated banking terminal.

FIG. 3 illustrates an exemplary method of facilitating a financial transaction at automated banking terminal 200 or at another type of automated banking terminal. At step 310 the method starts by launching a transaction staging application on a computing device like personal computer 110 or mobile device 120. The transaction staging application comprises a software application which may reside on the computing device, may be accessed over a network, or may be accessed as a web page. At step 320, transaction data associated with the financial transaction is entered into the transaction staging application in a user interface of the computing device. This allows the customer to complete some of the steps of the transaction at home, in their car, or at some location other than standing in front of the automated banking terminal.

Once the customer begins the transaction at the automated banking terminal, the previously entered transaction data is retrieved and made available to the automated banking terminal (step 330). Any remaining steps associated with the financial transaction are completed while the customer is at the automated banking terminal (step 340). These remaining steps may involve depositing cash, receiving cash, depositing checks, submitting biometric data, printing documents, scanning documents, or other steps which require direct interaction with the automated banking terminal.

In some embodiments, the computing device used in steps 310 and 320 of FIG. 3 comprises a mobile computing device. In this case, a communication link may be established between the between the mobile computing device and the automated banking terminal. This connection may be a wireless connection or a wired connection which is established when the customer approaches the automated banking terminal.

In other embodiments, the transaction data which is pre-entered by the customer is transmitted to an automated banking server, ATM network 160, bank 150, or some centralized computing system. When the customer begins the banking transaction at the automated banking terminal, the transaction data is retrieved from this centralized location. One example of this type of operation may be a customer who pre-enters the transaction from a home computer or a mobile device and then goes to the automated banking terminal to complete the transaction at some later time. The automated banking terminal may be triggered to retrieve the transaction data in response to receipt of some type of customer identifying information. This information could be an account number, a passcode, biometric information, a swipe of an account card, a token, or other information which identifies the customer or the transaction. For example, the customer may receive a barcode such as a quick response (QR) code or other tokens after initiating the transaction. The token may contain information regarding the desired transaction, as well as other contextual transaction information, such as information about the customer, the time the transaction was started or completed, the expiration of the barcode, etc. The token may be exchanged from a mobile computing device to a kiosk or banking terminal (and vice versa) to transfer the financial transaction from one device to the other. The token may also securely identify that a given customer is actually standing near, or within a predetermined proximity of the kiosk or automated banking terminal. The automated banking terminal may transmit the financial transaction information to a mobile device of the user by use of a token or otherwise.

Figure 4:
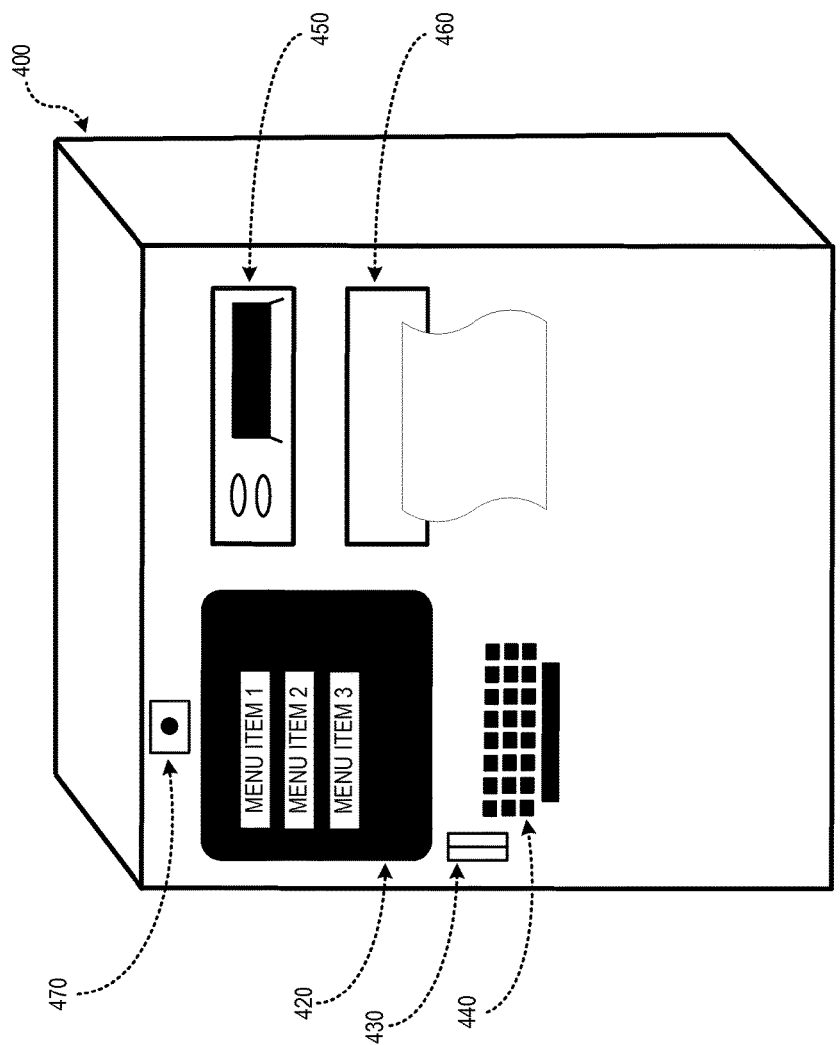
FIG. 4 illustrates an automated banking terminal.

FIG. 4 illustrates automated banking terminal 400. Automated banking terminal 400 is an example of automated banking terminal 170 and automated banking terminal 200 although other configurations and operations are possible. Automated banking terminal 400 comprises display 420, card reader 430, user interface 440, cash module 450, printing module 460, and camera 470.

Display 420 is an example of display 220 although other configurations and operations are possible. Camera 470 is an example of camera 270 although other configurations and operations are possible.

Card reader 430 comprises any type of device for reading information from an account card. Card reader 430 could be configured to read magnetic strips, memory cards, SIM cards, or read electronic information through other means including through wired or wireless connections. A similar device could also be used to interface with a customer's mobile computing device.

User interface 440 comprises any type of device for receiving customer input and could comprise a keyboard, mouse, touchscreen, keypad, button array, or input device of another type. User interface 440 may also be implemented on the mobile computing device of a customer.

Cash module 450 is one example of expansion module 262 or 264 as illustrated in FIG. 2. Cash module 450 is interfaced to automated banking terminal 400 through an expansion slot similar to expansion slots 252-256 of FIG. 2. Printer module 460 is another example of expansion module 262 or 264 as illustrated in FIG. 2. Printer module 460 is also interfaced to automated banking terminal 400 through an expansion slot similar to expansion slots 252-256 of FIG. 2. Many other expansion modules are possible and these two are shown for illustration purposes only. In some embodiments, the automated banking terminal includes an automated banking module check scanner module that allows for a check to be retained within the automated banking terminal and returns the check to the customer with the check destroyed to prevent representment. The check may be destroyed by various methods. For example, the MICR (magnetic ink character recognition) line may destroyed by punching holes or spraying magnetic ink in significant places along the MICR characters to destroy the routing number and account number.

It should be understood that functions of automated banking terminal 400 may also be implemented on computing platforms of other types including a personal computer. In the personal computer implementation, the personal computer may be implemented with a safe, lock-box, or cash box of some other type. Banking transactions could be performed using the personal computer and a network connection and any cash interactions will be accomplished by depositing cash to or withdrawing cash from the safe, lock-box, or cash box. A similar implementation could be accomplished using a customer's mobile computing device in which the interaction occurs using the mobile computing device and a publicly available banking terminal comprising a cash box and a network connection.

Figure 5:
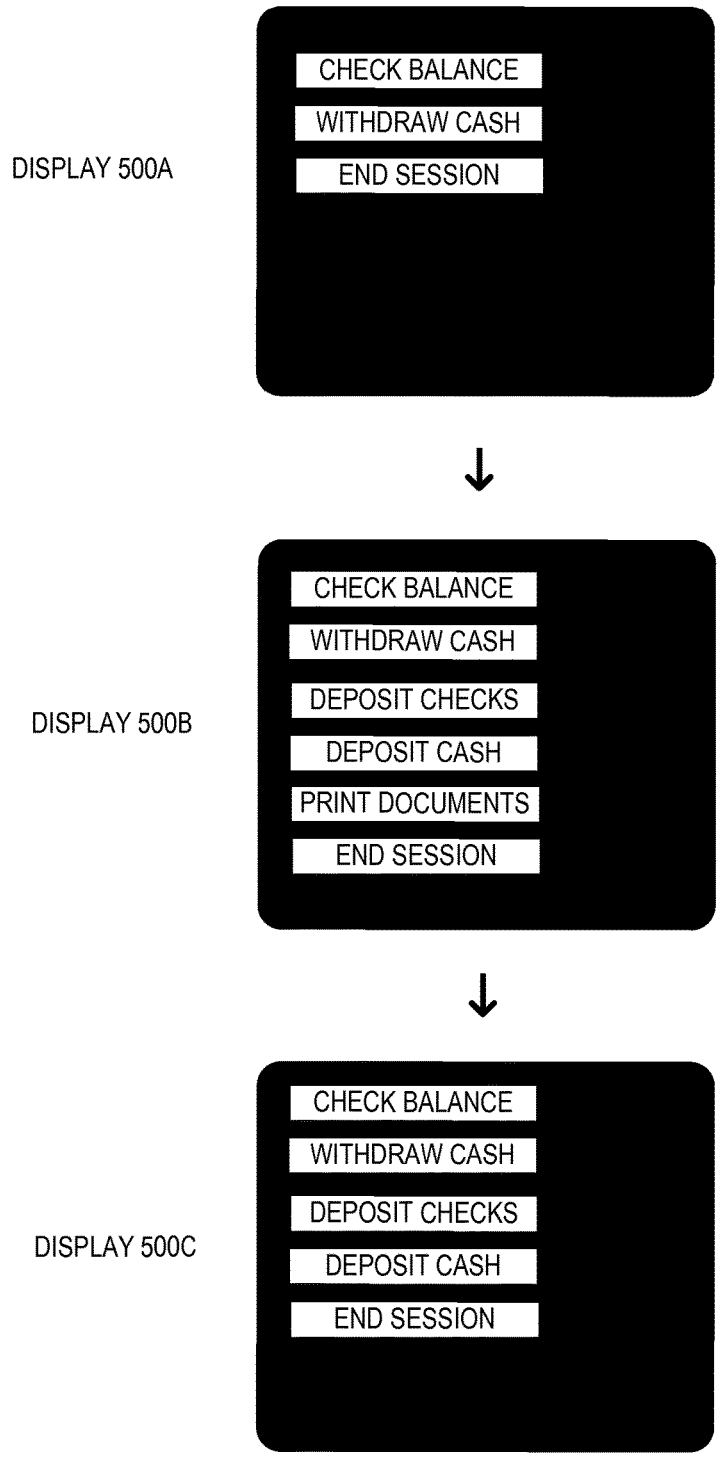
FIG. 5 illustrates an exemplary sequence of menu options presented on a display of an automated banking terminal.

FIG. 5 illustrates an exemplary sequence of menu options presented on a display of automated banking terminal 170, 200, or 400. The sequence is one possible series of menu options displayed to customers as the configuration of the automated banking terminal changes over time. Display 500A depicts the menu options which may be available on the automated banking terminal when only the basic cash withdrawal features are enabled. In this mode, a customer may check their account balance, withdraw cash, or end the banking session. Other features may not be available because expansion modules associated with these features are not installed, are not functioning properly, need serviced, or have otherwise been deactivated by the operator of the automated banking terminal.

At some point in time, the operator may enable deposit and printing features on the automated banking terminal. This may be accomplished by inserting one or more expansion modules, like expansion module 262 or 264, into one or more expansion slots of the terminal. Also, these features may be added by enabling capabilities or modules which are already present in the banking terminal. In either case, display 500B illustrates new menu options which are available to the customer based on these new features. In this example, menu options are now available for depositing checks or cash as well as for printing documents. In some examples, the software of the automated banking terminal automatically detects the addition or connection of expansion modules and automatically determines what additional menu options will be made available to the customer.

At a later point in time, a module may be removed, need servicing, or become inoperable for some other reason. The automated banking terminal automatically detects the removal or discontinued operation of the expansion module and automatically makes appropriate changes to the list of available menu options. In this way, a customer is not presented with a menu option for a feature which is not currently working. In this example, the "print documents" menu option has been removed from display 500C. This may be because the printing module has been removed, failed, needs printing supplies replenished, or has been deactivated by the automated banking terminal for some other reason. Once the printing module is again available or activated, this menu option will return and be available to customers.

Figure 6:
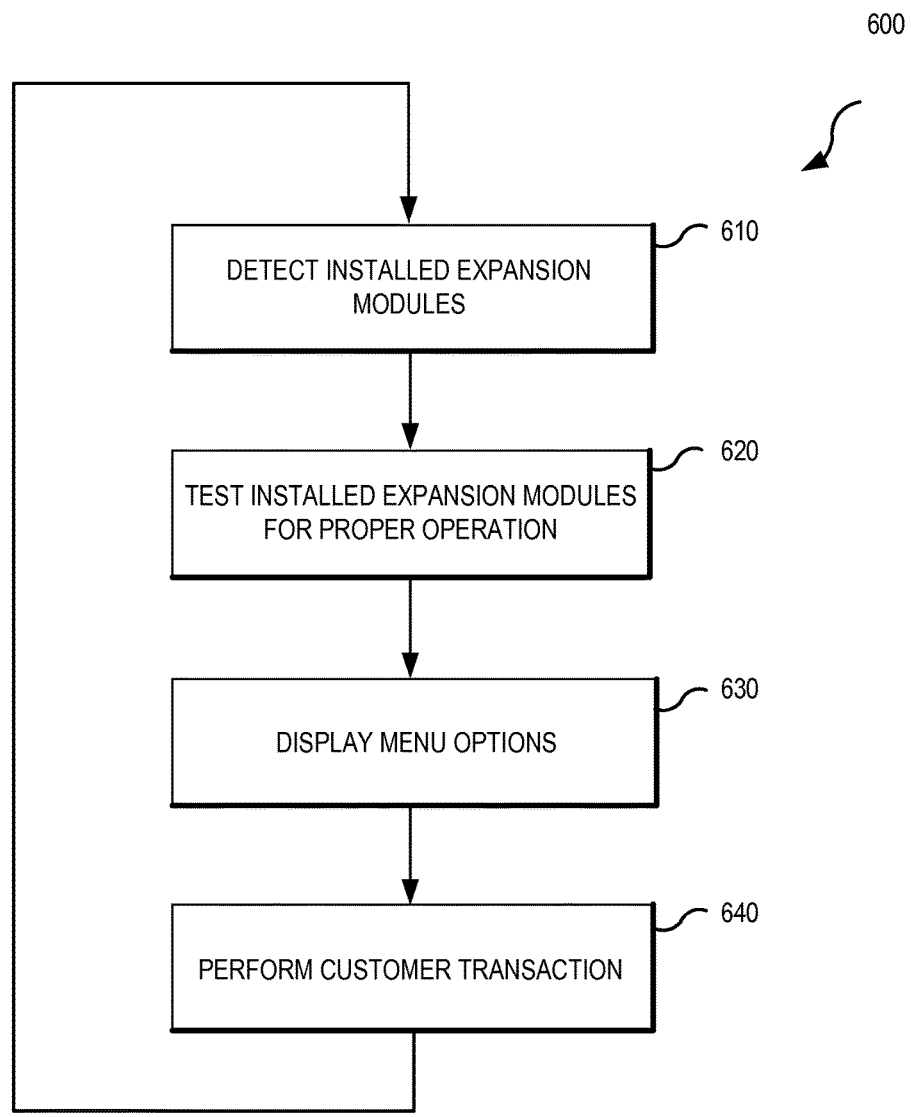
FIG. 6 illustrates an exemplary method of configuring an automated banking terminal.

FIG. 6 illustrates an exemplary method of configuring an automated banking terminal. At step 610, the automated banking terminal determines which expansion modules are installed. Their installation may be determined through a mechanical detection, an electrical detection, inputs made by a technician, or any combination thereof. At step 620, the automated banking terminal tests the detected modules for proper operation. These tests may be completed using automated diagnostic routines, using input from a technician, or some combination thereof. Once a determination is made regarding which installed expansion modules are operating correctly, software running on the processor of the automated banking terminal determines which menu options will be displayed. The determination is based, at least in part, on which expansion modules are installed and operating. Features associated with some menu options may be built into the automated banking terminal, may be available elsewhere, or may not be associated with an expansion module.

At step 630, the applicable menu options are displayed. In some examples, this may result in a display similar to display 500A. Many other configurations are possible. A customer may now choose from these available menu options and perform a banking transaction (step 640).

The automated banking terminal will periodically, or in response to command from the operator, return to step 610 and perform a reassessment of which modules are installed and operating properly. Based on the most recent detection and test of the expansion modules, new menu options may be added (as illustrated by a transition from display 500A to display 500B) or menu options may be removed (as illustrated by a transition from display 500B to display 500C).

In some embodiments, the banking terminal detects the functionality and status of each module installed and exchanges the information with a central host. For example, when there is a change in the status of the banking terminal, the banking terminal may detect the change and self-report the change to a central host. The up-to-date information regarding the particular functionality of each banking terminal and status information may be documented in a database. Customers may access the banking terminal information via an application provided by the banking terminal's owner or other entity associated with the banking terminal. The customer may specify the functionality required, and the application may be configured to present the user with a list and/or a map of locations of banking terminals in which the particular functionality is installed and in service. Thus, the self-detection feature of the banking terminal may also be used to provide customers near real-time information regarding the functionality of a banking terminal.

In some embodiments, the banking terminal communicates information to customers' computing device independent of a central host. For example, the banking terminal may be configured to communicate with a customer computing device via BlueTooth, WiFi, NFC or other protocol. In operation, the customer may be in a location near a banking terminal and desire to deposit a check. The customer's computing device configured to receive such communication may receive information from the banking terminal reporting which components are installed and the operational status of those components. For example, the banking terminal may provide an indication to the customer's computing device that the banking terminal is equipped with the functionality to deposit a check, but that the check depositing feature is not currently in service. The banking terminal may be further configured to determine nearby banking terminals with the desired functionality and operational status and report this information to the customer. Thus, the banking terminal has interactive features available to customers.

Figure 7:
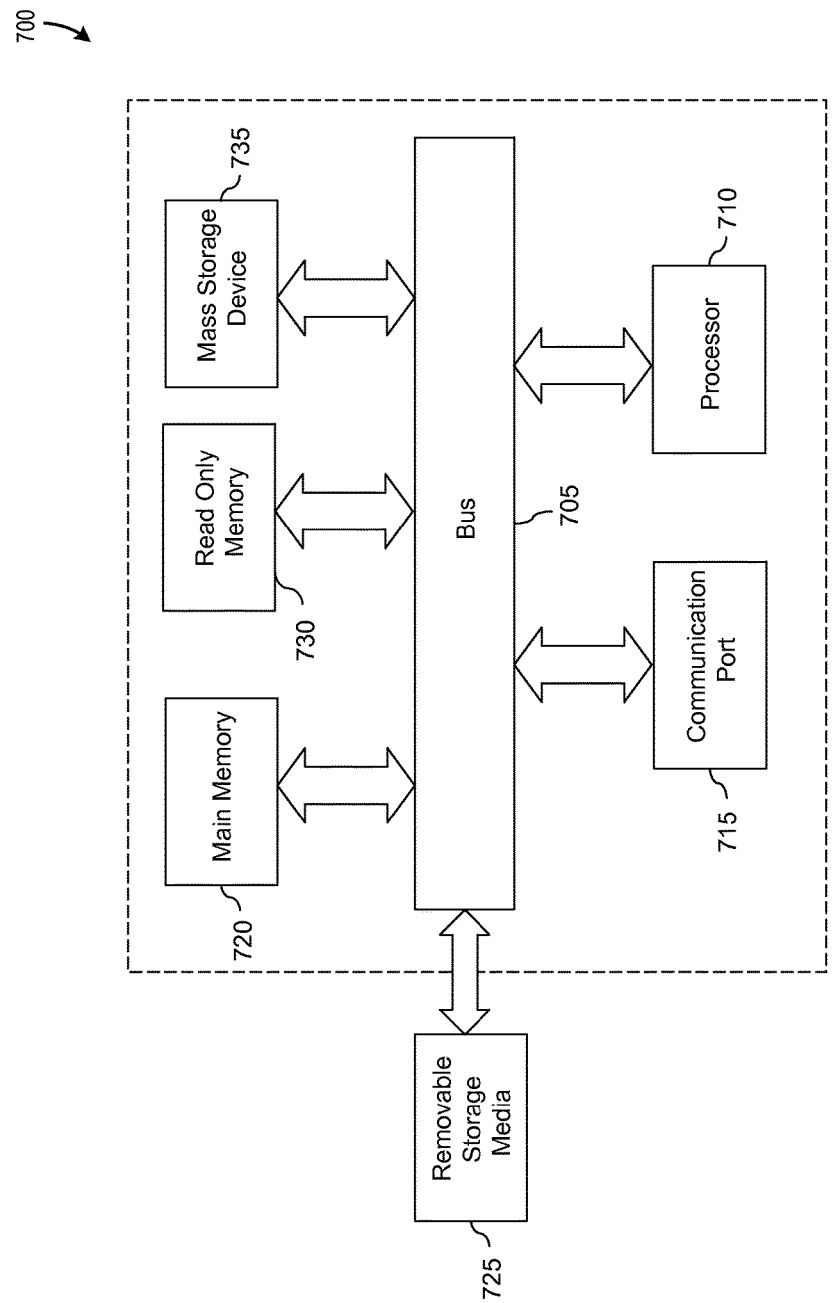
FIG. 7 illustrates an example of a computer system with which some embodiments of the present invention may be utilized.

Exemplary Computer System Overview:

Embodiments of the present invention include various steps and operations, which have been described above. A variety of these steps and operations may be performed by hardware components or may be embodied in instructions which are machine-executable and machine-readable. These instructions may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present invention may be utilized. According to the present example, the computer system includes a bus 705, at least one processor 710, at least one communication port 715, a main memory 720, a removable storage media 725, a read only memory 730, and a mass storage 735.

Processor(s) 710 can be any known processor, such as, but not limited to, an Intel® Itanium® or Itanium 2® processor(s), or AMD® Opteron® or Athlon MP® processor(s), or Motorola® lines of processors. Communication port(s) 715 can be any of an RS-232 port for use with a modem based dialup connection, a 10/100 Ethernet port, or a Gigabit port using copper or fiber. Communication port(s) 715 may be chosen depending on a network such a Local Area Network (LAN), Wide Area Network (WAN), or any network to which the computer system 700 connects.

Main memory 720 can be Random Access Memory (RAM), or any other dynamic storage device(s) commonly known in the art. Read only memory 730 can be any static storage device(s) such as Programmable Read Only Memory (PROM) chips for storing static information such as instructions for processor 710.

Mass storage 735 can be used to store information and instructions. For example, hard disks such as the Adaptec® family of SCSI drives, an optical disc, an array of disks such as RAID, such as the Adaptec family of RAID drives, or any other mass storage devices may be used. The storage medium may be transitory or non-transitory.

Bus 705 communicatively couples processor(s) 710 with the other memory, storage, and communication blocks. Bus 705 can be a PCI/PCI-X or SCSI based system bus depending on the storage devices used.

Removable storage media 725 can be any kind of external hard-drives, floppy drives, (OMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Terminology:

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "in some examples" and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a non-transitory machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to performing certain banking transactions, the invention is not limited to the specific examples of transaction described here. The invention may also be applicable to many other types of transactions performed at an automated banking terminal or transactions performed at a computing device of another type.

Also, for the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as computers, smartphones, and mobile computing devices. In addition, embodiments are applicable to all levels of computing from a personal computer to large network mainframes and servers.

In conclusion, the present invention provides novel systems, methods, and arrangements for systems and methods to facilitate financial transactions. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. An automated banking terminal for facilitating a financial transaction comprising:
    a processor;
    a display for presenting a set of customer menu options;
    a communication interface;
    a plurality of expansion slots each comprising a mechanical interface and an electrical interface; and
    an expansion module operationally connected to the processor through at least one of the plurality of expansion slots wherein the expansion module comprises one or more of: a cash dispensing module, a cash receiving and counting module, a check receiving module, a card dispensing module, a check printing module, a location aware applications module, a video conferencing module, augmented reality friendly devices, a printer, a scanner, a biometric interface, a signature pad, an account card reader, or an account card programmer;
    wherein the processor is configured to:
        detect the expansion module,
        receive information that includes an identity of a customer,
        arrange menu options in the set of customer menu options based at least in part on the detected expansion module and the identity of the customer,
        establish a communication session through the communication interface with a second automated banking terminal located within a designated distance of the automated banking terminal,
        receive feature information for an expansion module of the second automated banking terminal, and
        determine ancillary menu options to supplement the set of customer menu options based in part on the received feature information for the expansion module of the second automated banking terminal.

2. The automated banking terminal of claim 1 wherein the menu options are arranged in an order of priority based on frequency of use, and wherein the processor is further configured to:

detect discontinued operation of the expansion module; and remove at least a portion of the menu options from the set of customer menu options in response to detecting the discontinued operation of the expansion module.

3. The automated banking terminal of claim 1 further comprising a camera for monitoring the customer of the automated banking terminal, and wherein the processor is further configured to perform analysis on an image from the camera to determine the identity of the customer or a mood of the customer.

4. The automated banking terminal of claim 3 wherein the processor, using the display, the camera, and the communication interface, is further configured to initiate a live interactive help session with a remote customer service agent based on the identity of the customer or the mood of the customer.

5. The automated banking terminal of claim 1 wherein the processor is further configured to:

establish a wireless communication session through the communication interface with a mobile computing device of the customer;

receive, in the wireless communication session, instructions for the financial transaction input by the customer in a user interface of the mobile computing device; and identify that the customer is within a predetermined proximity of the automated banking terminal.

6. The automated banking terminal of claim 3 wherein the camera is further configured to monitor an area around the automated banking terminal, and wherein the processor is further configured to:

perform the analysis on the image received from the camera to determine a size of a line of additional customers waiting to use the automated banking terminal;

estimate a wait time based on the size of the line of additional customers; and transmit the estimated wait time over the communication interface.

7. The automated banking terminal of claim 1 wherein the expansion module comprises the printer, wherein the processor is further configured to print a document associated with a customer account when the customer account is accessed at the automated banking terminal, wherein the expansion module comprises the scanner, and wherein the processor is further configured to receive the document from the customer.

8. The automated banking terminal of claim 1 wherein:

the expansion module is configured to receive a cash deposit or a payment; and the processor is further configured to:

determine a deposit amount or a payment amount of the cash deposit or the payment; and provide an access code which enables withdrawal or receipt of cash in an amount less than or equal to the deposit amount at the second automated banking terminal.

9. The automated banking terminal of claim 1 wherein:

the expansion module is configured to receive a cash deposit from the customer; and the processor is further configured to:

determine a deposit amount of the cash deposit; and credit a prepaid card account in an amount less than or equal to the deposit amount.

10. The automated banking terminal of claim 9 wherein the automated banking terminal provides a prepaid card associated with the prepaid card account to the customer.

11. A method of facilitating a financial transaction comprising:

providing an automated banking terminal, wherein the automated banking terminal comprises:

a processor;

a display for presenting a set of customer menu options;

a communication interface;

a plurality of expansion slots each comprising a mechanical interface and an electrical interface; and an expansion module operationally connected to the processor through at least one of the plurality of expansion slots wherein the expansion module comprises one or more of: a cash dispensing module, a cash receiving and counting module, a check receiving module, a card dispensing module, a check printing module, a location aware applications module, a video conferencing module, augmented reality friendly devices, a printer, a scanner, a biometric interface, a signature pad, an account card reader, or an account card programmer; and configuring the processor to:

detect the expansion module, receive information that includes an identity of a customer, arrange menu options in the set of customer menu options based at least in part on the detected expansion module and the identity of the customer, establish a communication session through the communication interface with a second automated banking terminal located within a designated distance of the automated banking terminal, receive feature information for an expansion module of the second automated banking terminal, and determine ancillary menu options to supplement the set of customer menu options based in part on the received feature information for the expansion module of the second automated banking terminal.

12. The method of claim 11 wherein the menu options are arranged in an order of priority based on frequency of use, and wherein the processor is further configured to:

detect discontinued operation of the expansion module; and remove at least a portion of the menu options from the set of customer menu options in response to detecting the discontinued operation of the expansion module.

13. The method of claim 11 further comprising providing a camera for monitoring the customer of the automated banking terminal, and wherein the processor is further configured to perform analysis on an image from the camera to determine the identity of the customer or a mood of the customer.

14. The method of claim 13 wherein the processor, using the display, the camera, and the communication interface, is further configured to initiate a live interactive help session with a remote customer service agent based on the identity of the customer or the mood of the customer.

15. The method of claim 11 wherein the processor is further configured to:

establish a wireless communication session through the communication interface with a mobile computing device of the customer; and receive, in the wireless communication session, instructions for the financial transaction input by the customer in a user interface of the mobile computing device.

16. The method of claim 13 wherein the camera is further configured to monitor an area around the automated banking terminal, and wherein the processor is further configured to:

perform the analysis on the image received from the camera to determine a size of a line of additional customers waiting to use the automated banking terminal;

estimate a wait time based on the size of the line of additional customers; and transmit the estimated wait time over the communication interface.

17. The method of claim 11 wherein:

the expansion module is configured to receive a cash deposit; and the processor is further configured to:

determine a deposit amount of the cash deposit; and provide an access code which enables withdrawal of cash in an amount less than or equal to the deposit amount at the second automated banking terminal.

18. The method of claim 11 wherein:

the expansion module is configured to receive a cash deposit from the customer; and the processor is further configured to:

determine a deposit amount of the cash deposit; and credit a gift card account in an amount less than or equal to the deposit amount, wherein the automated banking terminal provides a gift card associated with the gift card account to the customer.

19. The automated banking terminal of claim 1 wherein:

the expansion module is configured to receive a cash deposit or a payment; and the processor is further configured to:

determine a deposit amount or a payment amount of the cash deposit or the payment; and credit a mobile wallet of an intended recipient.

* * * * *